United States Patent [19]
Ueda et al.

[11] Patent Number: 5,510,850
[45] Date of Patent: Apr. 23, 1996

[54] VIDEO SIGNAL CORRECTION DEVICE

[75] Inventors: Osamu Ueda; Teruo Hieda, both of Kanagawa; Hideo Kawahara, Saitama, all of Japan

[73] Assignee: Canon Kabushiki Kaisha, Tokyo, Japan

[21] Appl. No.: 341,697

[22] Filed: Nov. 18, 1994

Related U.S. Application Data

[60] Continuation of Ser. No. 985,847, Dec. 3, 1992, abandoned, which is a division of Ser. No. 900,508, Jun. 17, 1992, Pat. No. 5,196,923, which is a continuation of Ser. No. 800,888, Nov. 27, 1991, abandoned, which is a continuation of Ser. No. 527,062, May 22, 1990, abandoned.

[30]  Foreign Application Priority Data

| May 25, 1989 | [JP] | Japan | 1-130123 |
| May 25, 1989 | [JP] | Japan | 1-130124 |
| May 25, 1989 | [JP] | Japan | 1-130125 |
| May 25, 1989 | [JP] | Japan | 1-130126 |
| May 25, 1989 | [JP] | Japan | 1-130127 |

[51] Int. Cl.$^6$ ................................................. H04N 9/73
[52] U.S. Cl. ........................................ 348/649; 348/651
[58] Field of Search .................................. 348/624, 649, 348/651, 652, 653, 654

[56] References Cited

U.S. PATENT DOCUMENTS

| 4,500,919 | 2/1985 | Schreiber | 358/78 |
| 4,731,662 | 3/1988 | Udagawa et al. | 358/80 |
| 4,819,077 | 4/1989 | Kikuchi et al. | 358/80 |
| 5,089,882 | 2/1992 | Kaye et al. | 358/28 |
| 5,111,281 | 5/1992 | Sekiguchi | 358/28 |
| 5,181,105 | 1/1993 | Udagawa et al. | 358/80 |
| 5,282,021 | 1/1994 | Bachmann et al. | 348/649 |

*Primary Examiner*—Wendy R. Greening
*Attorney, Agent, or Firm*—Robin, Blecker, Daley & Driscoll

[57]  ABSTRACT

This invention is related to a video signal color correction device. Color information signal inputs are received in rectangular form. A coordinates conversion means converts the inputs into polar coordinates using one of the inputs as a polar axis. The device has a correction data storing means in which are stored luminance signal correction data dependent on a luminance signal and the polar coordinates and color information signal correction data. The correction data storing means outputs the luminance signal correction data and the color information signal correction data in accordance with the luminance signal and the polar coordinates. A correction means corrects the luminance signal and the polar coordinates on the basis of the luminance signal correction data and the color information signal correction data output from the correction data storing means. The correction means may include addition means for adding the luminance signal correction data to the luminance signal and the color information signal correction data to the polar coordinates.

6 Claims, 14 Drawing Sheets

| CONTROL SIGNAL i | SIGNALS a AND b | CONVERSION OUTPUT DATA c AND d |
|---|---|---|
| 0 | 31 | 15 |
|   | 23 | 11 |
|   | 16 | 8 |
|   | 15 | 7 |
|   | 7  | 3 |
|   | 0  | 0 |
| 1 | 31 | 15 |
|   | 23 | 15 |
|   | 16 | 8 |
|   | 15 | 7 |
|   | 7  | 0 |
|   | 0  | 0 | as a divisional of Ser. No. 07/900,
VIDEO SIGNAL CORRECTION DEVICE

This is a continuation application under 37 CFR 1.62 of prior application Ser. No. 07/985,847, filed Dec. 3, 1992, now abandoned, which is a divisional of Ser. No. 07/900,508, filed Jun. 17, 1992, now U.S. Pat. No. 5,196,923, which is a continuation of Ser. No. 07/800,888, filed Nov. 27, 1991, abandoned, which is a continuation of Ser. No. 07/527,062, filed May 22, 1990, abandoned.

BACKGROUND OF THE INVENTION

1. Field of the Invention

This invention relates to a video signal correction device for correcting a video signal.

2. Description of the Related Art

Color video cameras are becoming popular as a result of efforts to reduce their size, weight and electric energy consumption. At present, these color video cameras are arranged to obtain a color video signal by using an image sensor which is, for example, a CCD (charge-coupled device) or the like.

In obtaining a color video signal, some of the color video cameras are arranged to mix a red signal, a green signal and a blue signal in such a mixing ratio that differs from an ordinary ratio depending upon the image sensing method employed. In such a case, the color video signal which is obtained by such a camera shows a different reproducibility from the original color image. In other words, the color image in some cases cannot be reproduced with fidelity depending on the processing method employed for an image sensing system.

SUMMARY OF THE INVENTION

It is a general object of this invention to provide a video signal correction device which is capable of solving the above-stated problem.

It is a more specific object of the invention to provide a video signal correction device which is arranged to always appositely correct a video signal according to the level of the video signal, so that the reproducibility of video signals can be enhanced.

Under this object, a video signal correction device which is arranged as an embodiment of this invention to correct a video signal comprises: correction signal forming means, arranged to input a video signal, for forming a correction signal corresponding to the input video signal; addition means for adding the correction signal formed by the correction signal forming means to the input video signal; and control means for varying the level of the correction signal formed by the correction signal forming means according to the level of the input video signal supplied to the correction signal forming means.

It is another object of the invention to provide a video signal correction device which is capable of correcting the reproducibility of a video signal on the basis of a part of the video signal in a designated area of a picture plane which is expressed by the video signal.

Under that object, a video signal correction device arranged as an embodiment of the invention to correct a video signal comprises: correction signal forming means, arranged to input a video signal, for forming a correction signal corresponding to the input video signal; control means for designating an arbitrary area of a picture plane expressed by the input video signal and for controlling a correction signal forming action of the correction signal forming means on the basis of a part of the video signal in the designated area; and correction means for correcting the input video signal on the basis of the correction signal formed by the correction signal forming means.

It is a further object of the invention to provide a video signal correction device which is capable of correcting a video signal in an arbitrary manner.

Under this object, a video signal correction device which is arranged as an embodiment of the invention to correct a video signal comprises: rewritable correction data storing means for outputting correction data on the basis of an input video signal; and correction means for correcting the input video signal on the basis of the correction data output from the correction data storing means.

It is a further object of the invention to provide a video signal correction device which is capable of correcting a video signal without deteriorating the luminance signal of the video signal.

Under the above-stated object, a video signal correction device arranged as an embodiment of the invention to correct a video signal comprises: analog-to-digital conversion means, arranged to input an analog luminance signal, for converting the luminance signal into a digital luminance signal; correction data forming means for limiting a band of the digital luminance signal output from the analog-to-digital conversion means to a frequency band lower than a sampling frequency of the analog-to-digital conversion means and for forming correction data on the basis of the band-limited digital luminance signal; and correction means for correcting, by using the correction data output from the correction data forming means, the digital luminance signal output from the analog-to-digital conversion means.

It is a further object of the invention to provide a video signal correction device which is capable of correcting a video signals to give adequate reproducibility despite a simple structural arrangement thereof.

Under this object, a video signal correction device arranged according to this invention to correct a video signal comprises coordinates conversion means, arranged to input two kinds of color information signals, for producing polar coordinates data by using one of the input two kinds of color information signals as a polar axis; correction data forming means for forming color information signal correction data according to the polar coordinates data output from the coordinates conversion means and for outputting the color information signal correction data; and correction means for correcting the polar coordinates data output from the coordinates conversion means on the basis of the color information signal correction data output from the correction data forming means.

The above and other objects and features of the invention will become apparent from the following detailed description of embodiments thereof taken in connection with the accompanying drawings.

DETAILED DESCRIPTION OF THE PREFERRED EMBODIMENTS

Figure 1:
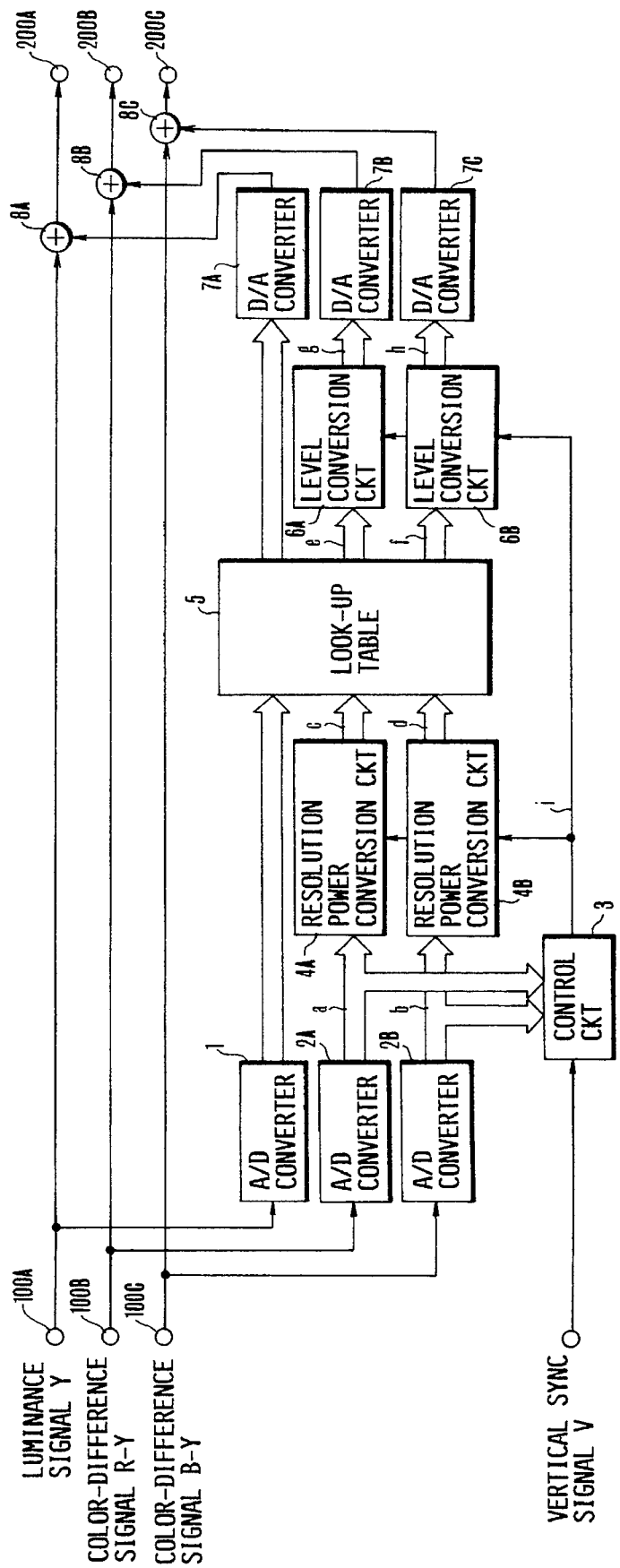
FIG. 1 is a block diagram showing in outline the arrangement of an embodiment of this invention.

The following describes the details of this invention through embodiments thereof with reference to the accompanying drawings:

FIG. 1 shows in outline the arrangement of a first embodiment of the invention. Referring to FIG. 1, input terminals 100A, 100B and 100C are arranged to receive a luminance signal Y and two color-difference signals R-Y and B-Y respectively. A 4-bit A/D (analog-to-digital) converter 1 is arranged to receive the luminance signal Y supplied from the input terminal 100A. Two 5-bit A/D converters 2A and 2B are arranged to receive the color-difference signals R-Y and B-Y supplied from the input terminals 100B and 100C respectively. A control circuit 3 is arranged to compare the levels of the color-difference signals received during one field period with a given reference value in synchronism with a vertical synchronizing (hereinafter abbreviated to sync) signal and to control a resolution power conversion circuit and a level conversion circuit according to the result of comparison. The resolution power conversion circuits 4A and 4B are arranged to convert the 5-bit digital color difference signals output from the A/D converters 2A and 2B into 4-bit digital color-difference signals. A look-up table 5 is composed of a ROM (read-only memory) or the like and is arranged to produce correction data according to the levels of the signals output from the A/D converter 1 and the resolution power conversion circuits 4A and 4B. The level conversion circuits 6A and 6B are arranged to convert,the levels of the correction data which relate to the color-difference signals and are output from the look-up table 5. 8-bit D/A (digital-to-analog) converters 7A, 7B and 7C are arranged to D/A-convert the correction data which relates to the luminance signal and is output from the look-up table 5 and the correction data which relate to the color difference signals and are output from the level conversion circuits 6A and 6B respectively. Addition circuits 8A, 8B and 8C are arranged to add correction signals output from the D/A converters 7A, 7B and 7C to the luminance signal and the color-difference signals supplied from the input terminals 100A, 100B and 100C respectively.

With the embodiment arranged as described above, the analog luminance signal Y and the analog color-difference signals R-Y and B-Y are respectively converted into the 4-bit and 5-bit digital signals by the A/D converters 1, 2A and 2B. The 5-bit digital color-difference signals output from the A/D converters 2A and 2B are supplied to the control circuit 3. The control circuit 3 then compares the digital color-difference signals with a predetermined reference level of five bits. The control circuit 3 produces a control signal according to the level of the input digital color-difference signals. Further, the digital color-difference signals output from the A/D converters 2A and 2B are supplied to the resolution power conversion circuits 4A and 4B. Upon receipt of the digital color-difference signals, the circuits 4A and 4B convert the input 5-bit digital color-difference signals into 4-bit digital color-difference signals according to the control signal received from the control circuit 3. The 4-bit digital color-difference signals output from the resolution power conversion circuits 4A and 4B and the 4-bit digital luminance signal output from the A/D converter 1 are all supplied to the look-up table 5. At the look-up table 5, 8-bit correction data which corresponds to each input digital signal has been stored beforehand. The correction data corresponding to the luminance signal and the color-difference signals are output from the look-up table 5. Of the 8-bit correction data output from the look-up table 5, the correction data which relate to the color-difference signals are supplied to the level conversion circuits 6A and 6B. The level conversion circuits 6A and 6B convert the input correction data into levels according to the control signal supplied from the above-stated control circuit 3. The level-converted correction data output from the level conversion circuits 6A and 6B and the correction data which relates to the luminance signal and is output from the look-up table 5 are respectively converted into analog correction signals by the 8-bit D/A converters 7A, 7B and 7C. The analog correction signals are supplied to the addition circuits 8A, 8B and 8C to be added to the luminance signal and the color-difference signals supplied to the input terminals 100A, 100B and 100C to correct these input signals. After completion of the correcting action, the corrected signals are output from Output terminals 200A, 200B and 200C.

Figure 2:
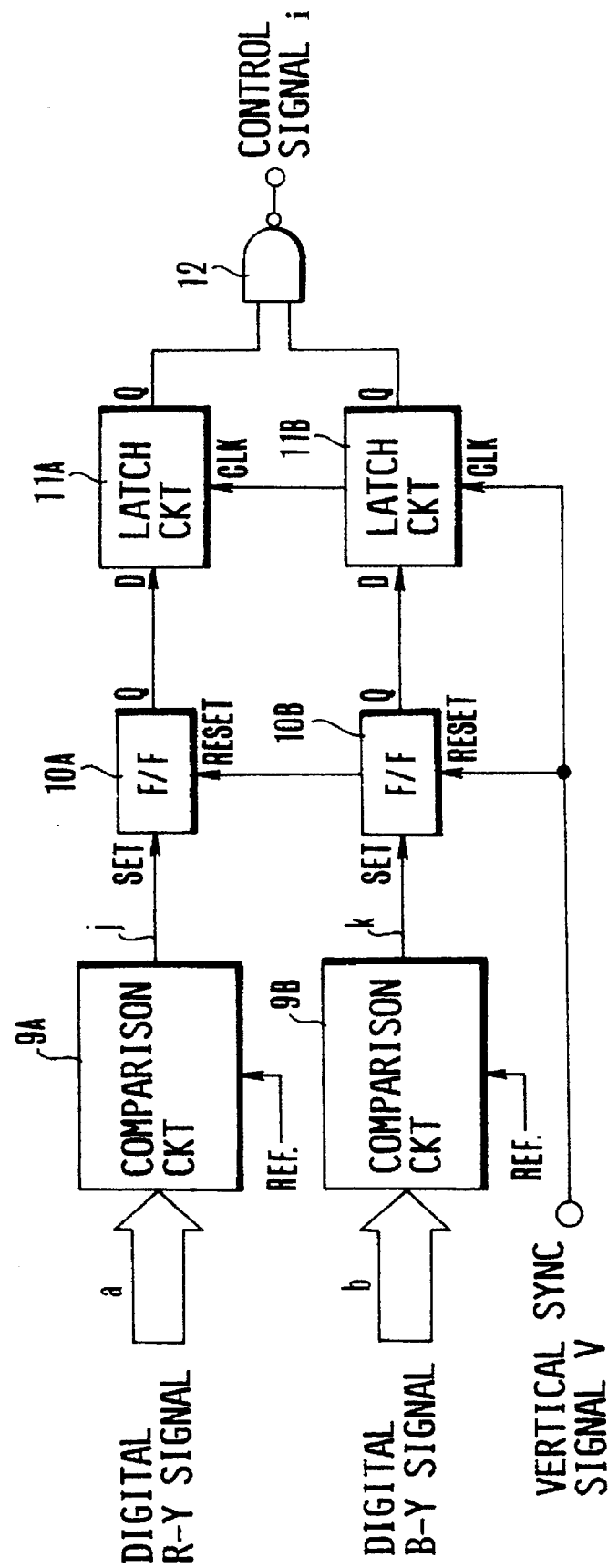
FIG. 2 is a block diagram showing by way of example the details of arrangement of a control circuit shown in FIG. 1.

The essential circuit elements of FIG. 1 are further described in detail below:

FIG. 2 shows by way of example the arrangement of the control circuit 3i Referring to FIG. 2, comparison circuits 9A and 9B are arranged to compare the 5-bit digital color-difference signals "a" and "b" output from the A/D converters 2A and 2B with a predetermined reference level. When the level of the input digital color-difference signal is found to be higher or lower than the reference level, each of the circuits 9A and 9B produces a signal indicating the result of comparison. The comparison circuits 9A and 9B operate on the following logic:

IF a>"23" OR a<"8" THEN j="0" ELSE j="1"

IF b>"23" OR b<"8" THEN k="0" ELSE k="1"

(wherein: "a" and "b" represent input data having levels of "0" to "31"; and "j" and "k" represent output data which are either "0" or "1")

In FIG. 2, reference numerals 10A and 10B denote flip-flop circuits (F/FS); 11A and 11B denote latch circuits; and 12 denotes a NAND gate.

With the control circuit 3 arranged as described above, when the 5-bit digital color-difference signals "a" and "b"

are supplied to the comparison circuits 9A and 9B, the value of the input signals "a" and "b" are compared in the manner as shown by the foregoing formula. Then, as a result, the output data "j" and "k" are obtained. The output data "j" and "k" are supplied to the SET terminals of the flip-flop circuits 10A and 10B. Meanwhile, a vertical sync signal V is supplied to the RESET terminals of the flip-flop circuits 10A and 10B. The flip-flop circuits 10A and 10B are thus arranged to be reset at the end of every vertical sync period. The signals of the flip-flop circuits 10A and 10B output from their Q terminals are supplied to the latch circuits 11A and 11B. To the clock (CLK) terminal of each of the latch circuits 11A and 11B is supplied the vertical sync signal V. The signals output from the flip-flop circuits 10A and 10B are thus latched in synchronism with the vertical sync signal V. Signals output from the latch circuits 11A and 11B are supplied to the NAND gate 12. The NAND gate 12 then produces a control signal "i".

As mentioned above, when the 5-bit digital color-difference signals are supplied to the control circuit 3, the control signal is obtained at "1" when the color-difference signal level obtained during each vertical sync period (or one field period) is high, and at "0" when the level is low.

Figure 3:
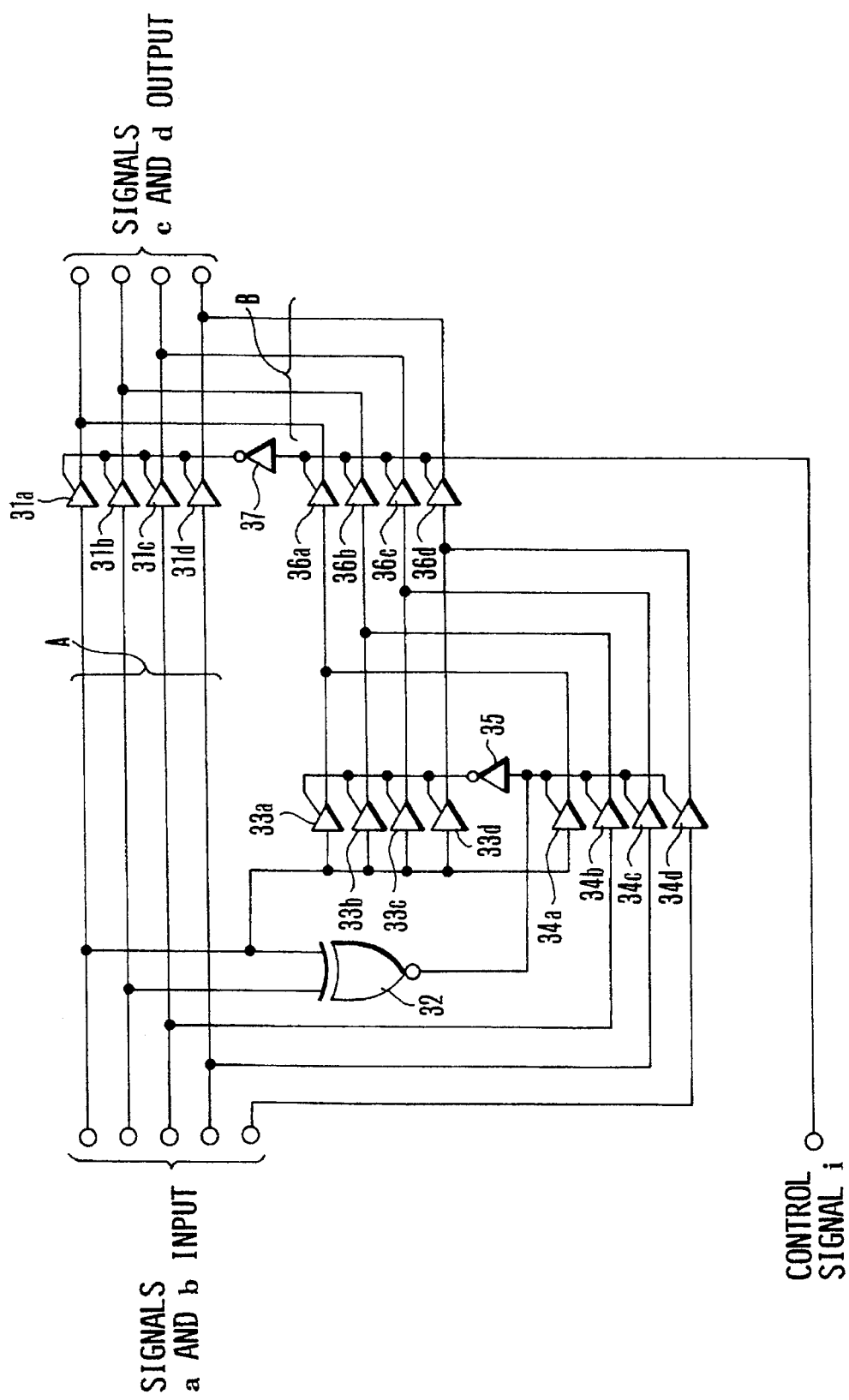
FIG. 3 is a block diagram showing by way of example the details of arrangement of a resolution power conversion circuit shown in FIG. 1.
Figures 4A, 4B:
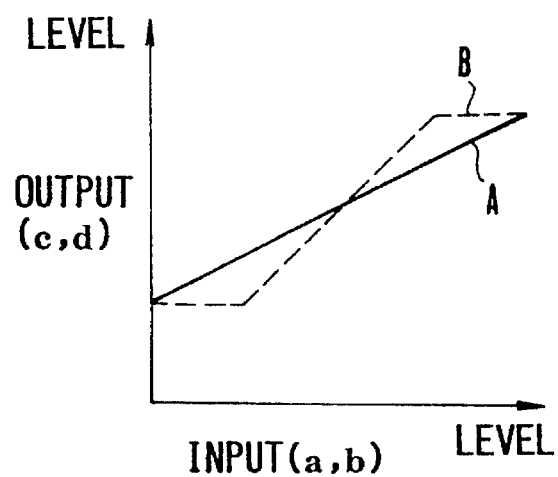
FIGS. 4(a) and 4(b) show the converting action of tile resolution power conversion circuit of FIG. 3.

FIG. 3 shows by way of example the arrangement of the resolution power conversion circuits 4A and 4B of FIG. 1. FIGS. 4(a) and 4(b) show the operation of the arrangement shown in FIG. 3. More specifically, FIG. 4(a) shows the digital color-difference signal "a" or "b" supplied from the A/D converter 2A or 2B and the conversion output data produced by the circuit 4A or 4B in response to the control signal "i" which is supplied from the control circuit 3. FIG. 4(b) shows data on signal lines A and B which are shown in FIG. 3.

Referring to FIG. 3, the conversion output data "c" or "d" is obtained by selecting either the signal lines A or B by three-state buffers 31a to 31d or 36a to 36d and an inverter 37. The upper four bits of the 5-bit digital color-difference signal output from the A/D converter 2A or 2B are supplied on the signal lines A. The level of the input digital color-difference signal becomes ½ in the whole area of the signal. Meanwhile, on the signal lines B is supplied the 5-bit digital color-difference signal from the A/D converter 2A or 2B with its level clipped through an exclusive NOR gate 32, three-state buffers 33a to 33d or 34a to 34d and an inverter 35 when the signal is at the upper ¼ or lower ¼ of the signal level. When the signal is within an intermediate level, the signal is output as it is.

In the arrangement shown in FIG. 3, the 5-bit digital color-difference signal supplied from the A/D converter 2A or 2B is Converted into 4-bit data on the basis of the control signal "i" in such a way as to have coarse resolution when the signal is at a high level and to have fine resolution when the signal level is low.

Figure 5:
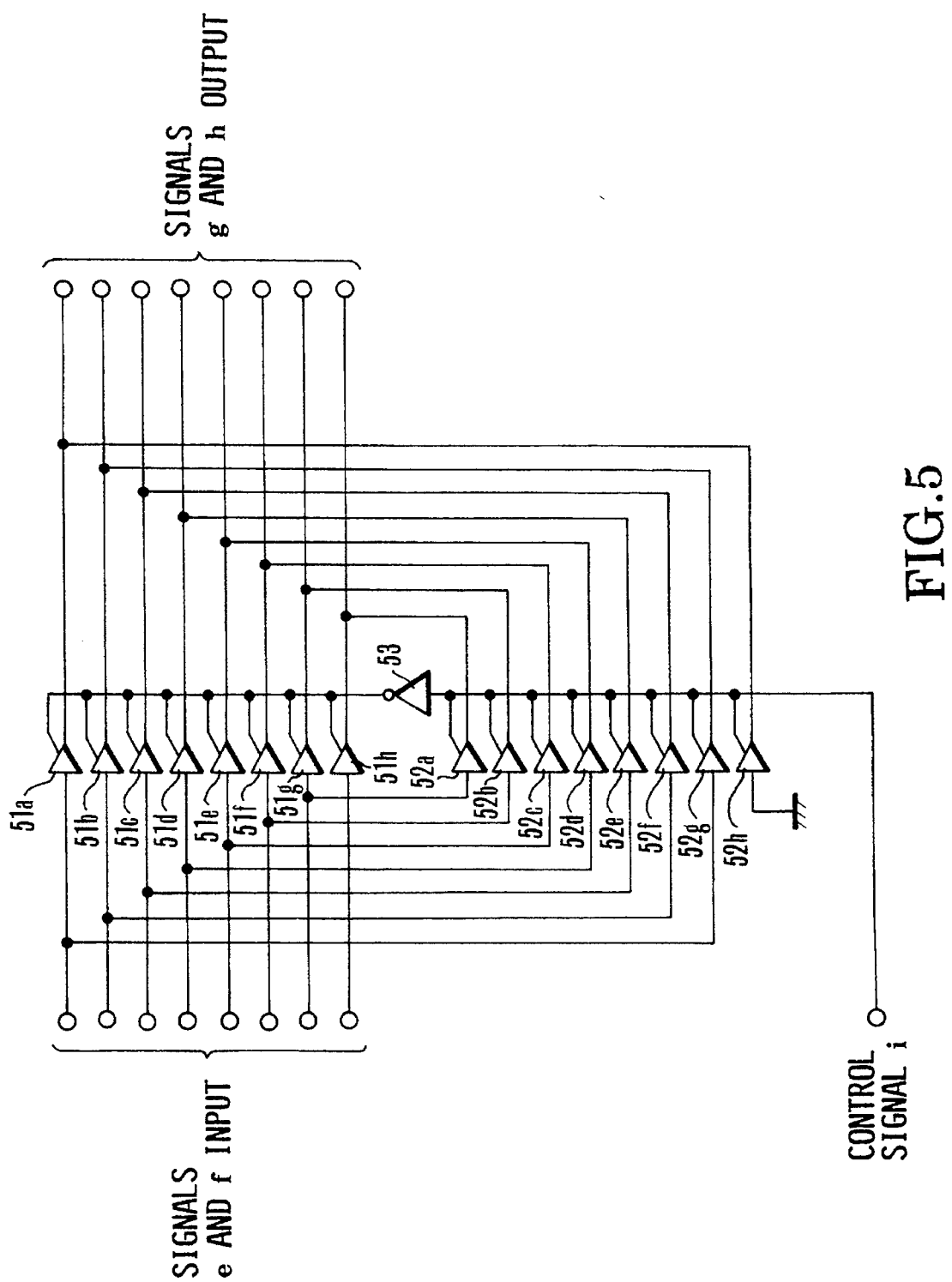
FIG. 5 is a block diagram showing by way of example the details of arrangement of a level conversion circuit shown in FIG. 1.

FIG. 5 shows by way of example the arrangement of the level conversion circuits 6A and 6B of FIG. 1.

The 8-bit correction data "e" or "f" output from the look-up table 5 is supplied to the level conversion circuit which is arranged as shown in FIG. 5. The control signal "i" causes the correction data to be output from the level conversion circuit with its level as it is when the color-difference signal is large or to have its level converted into ½ thereof before it is produced.

The arrangement shown in FIGS. 1 to 5 enables the first embodiment to convert the analog inputs of the luminance signal and the color-difference signals into digital signals; to produce the correction data corresponding to these digital signals from the look-up table 5 which is arranged to store beforehand the correction data; to D/A-convert the correction data output from the look-up table 5; to add the D/A-converted correction data to the analog inputs of the luminance signal and the color-difference signals; in adding the correction data, to convert the levels of the A/D-converted digital signals according to the level of the input color-difference signals; and then to convert the levels of the correction data output from the look-up table 5 according to the levels of the color-difference signals. The correction data thus can be obtained in an optimum state according to the levels of the color-difference signals without increasing the storage capacity of the look-up table 5.

Further, in the case of the first embodiment described above, the control signal "i" is arranged to be output in synchronism with the vertical sync signal. However, the control signal "i" may be arranged to be output in synchronism with a horizontal sync signal or any other sync signal instead of the vertical sync signal.

The first embodiment is capable of improving the reproducibility of the video signal as it performs the correcting action always in an optimum manner according to the levels of the color-difference signals.

A second embodiment of the invention is arranged as follows: In this case, a look-up table included in the embodiment includes a ROM (read-only memory) which is arranged to produce correction signals for a luminance signal and two color-difference signals supplied from the outside; adders which are arranged to add the correction signals output from the look-up table to the input signals; a latch circuit which is arranged to designate any arbitrary area of a picture plane expressed by the input luminance signal and the input color-difference signals and to hold a luminance Signal and a chrominance signal corresponding to the designated area; and a microcomputer which is arranged to rewrite, in accordance with the signals held by the latch circuit, the correction signals stored in the look-up table. The second embodiment is thus arranged to correction input video signal on the basis of a part of the video signal obtained within a designated area of the picture plane expressed by the input video signal.

Figure 6:
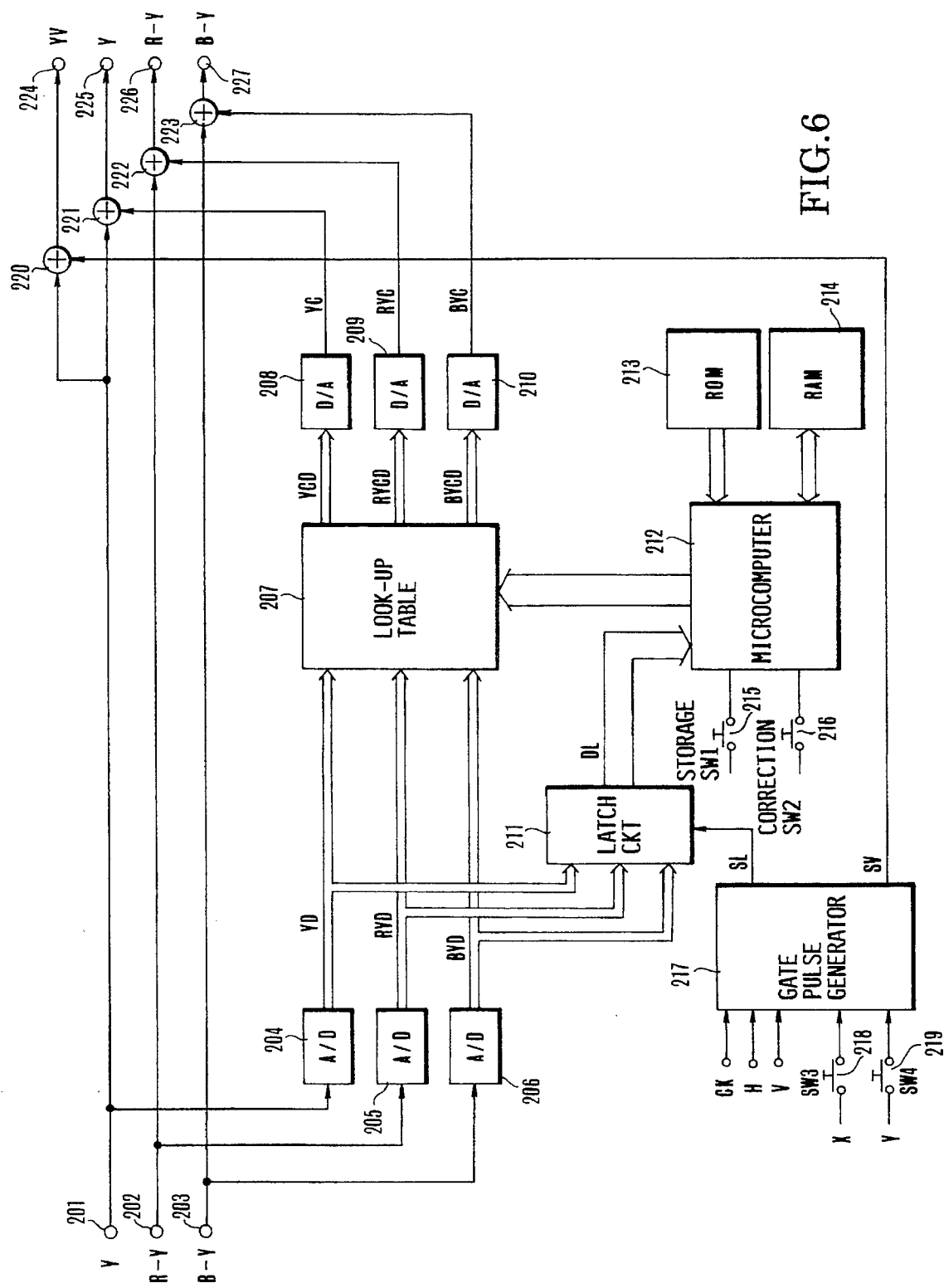
FIG. 6 is a block diagram showing in outline the arrangement of a second embodiment of the invention.

FIG. 6 shows in outline the arrangement of the second embodiment of the invention. Referring to FIG. 6, input terminals 201, 202 and 203 are arranged to receive the luminance signal Y, the color-difference signal R-Y and the color-difference signal B-Y respectively. The second embodiment includes A/D converters 204, 205 and 206; the look-up table 207 which is composed of the ROM, etc. and is arranged to store correction data YCD, RYCD and BYCD for the digitized input signals YD, RYD and BYD; and D/A converters 208, 209 and 210.

A latch circuit 211 is arranged to hold any part of the input video signal. A microcomputer 212 is arranged to rewrite the correction data stored in the look-up table 207. The ROM 213 stores the correction data for correction of the chrominance signal on the basis of the video signal part DL held by the latch circuit 211. Further, the correction data stored in the ROM 213 is arranged to be written into the look-up table 207 by the microcomputer 217. A reference numeral 214 denotes a RAM (random-access memory). Numerals 215, 216, 218 and 219 denote switches. A gate pulse generator 217 is arranged to generate a latch signal SL and a display signal SV according to a clock pulse CK, a horizontal sync pulse H and a vertical sync pulse V which are supplied from a camera part which is not shown and also according to X and Y signals supplied via switches SW3 and SW4.

Reference numerals 220, 221, 222 and 223 denote adders. A numeral 224 denotes a monitor output terminal which is provided for an electronic viewfinder or the like (not shown). Output terminals 225, 226 and 227 are provided for the signals Y, R-Y and B-Y respectively.

The second embodiment shown in FIG. 6 operates as follows: The signal Y, signals R-Y and B-Y output from a color video camera which is not shown are supplied to the input terminals 201, 202 and 203. These input signals are supplied to the adders 220 to 223 to have the correction signals YC, RYC and BYC added to them. Further, the input signals are supplied also to the A/D converters 204, 205 and 206 to be converted into the digital signals YD, RYD and BYD respectively.

The digital signals YD, RYD and BYD output from the A/D converters 204, 205 and 206 are supplied to the look-up table 207. Then, the correction data YCD, RYCD and BYCD which correspond to the digital signals YD, RYD and BYD are output from the look-up table 207. The correction data output from the look-up table 207 are supplied to the D/A converters 208, 209 and 210 to be converted into analog signals YC, RYC and BYC. These analog signals are supplied to the adders 220, 221, 222 and 223 to be added to the input signals Y, R-Y and B-Y. The outputs of the adders 220 to 223 thus obtained are supplied to the output terminals 224, 225, 226 and 227 respectively.

The digital signals YD, RYD and BYD are also supplied to the latch circuit 211. At the latch circuit 213, the digital signal which corresponds to an arbitrary part of the video signal (any desired area within a picture plane expressed by the input video signal) is latched in response to a latch signal SL generated by the gate pulse generator 217. Latch data DL which is thus obtained is then taken in by the microcomputer 212. More Specifically, a desired point is set on the picture plane by means of the switches 218 and 219. The gate pulse generator 217 generates a latch signal SL for taking in the digital signals YD, RYD and BYD for this point and, at the same time, also generates a display signal SV for the purpose of displaying on an electronic viewfinder (not shown) the arbitrary point on the picture plane set by the switches 218 and 219. The above-stated latch signal SL is supplied to the latch circuit 211 as mentioned above. The display signal SV is added at the adder 220 to the input signal Y coming from the input terminal 201 and is output from the monitor output terminal 224.

Further, the microcomputer 212 operates as follows: When the switch 215 (SW1) is pushed at first, the latch data DL is taken in and is written into the RAM 214. Next, when the switch 216 (SW2) is pushed, new correction data is read out from the ROM 213 and is written in the look-up table 207 for the purpose of rewriting the correction data stored in the look-up table 207 on the basis of the latch data DL stored in the RAM 214.

The correction data stored in the look-up table 207 is thus renewed on the basis of the video signal part of the arbitrary point on the picture plane designated by means of the switches 218 and 219 (or SW3 and SW4). Color correction is thus accomplished on the basis of the color obtained at the arbitrary point of the picture plane. This gives a good color reproducibility.

Figure 7:
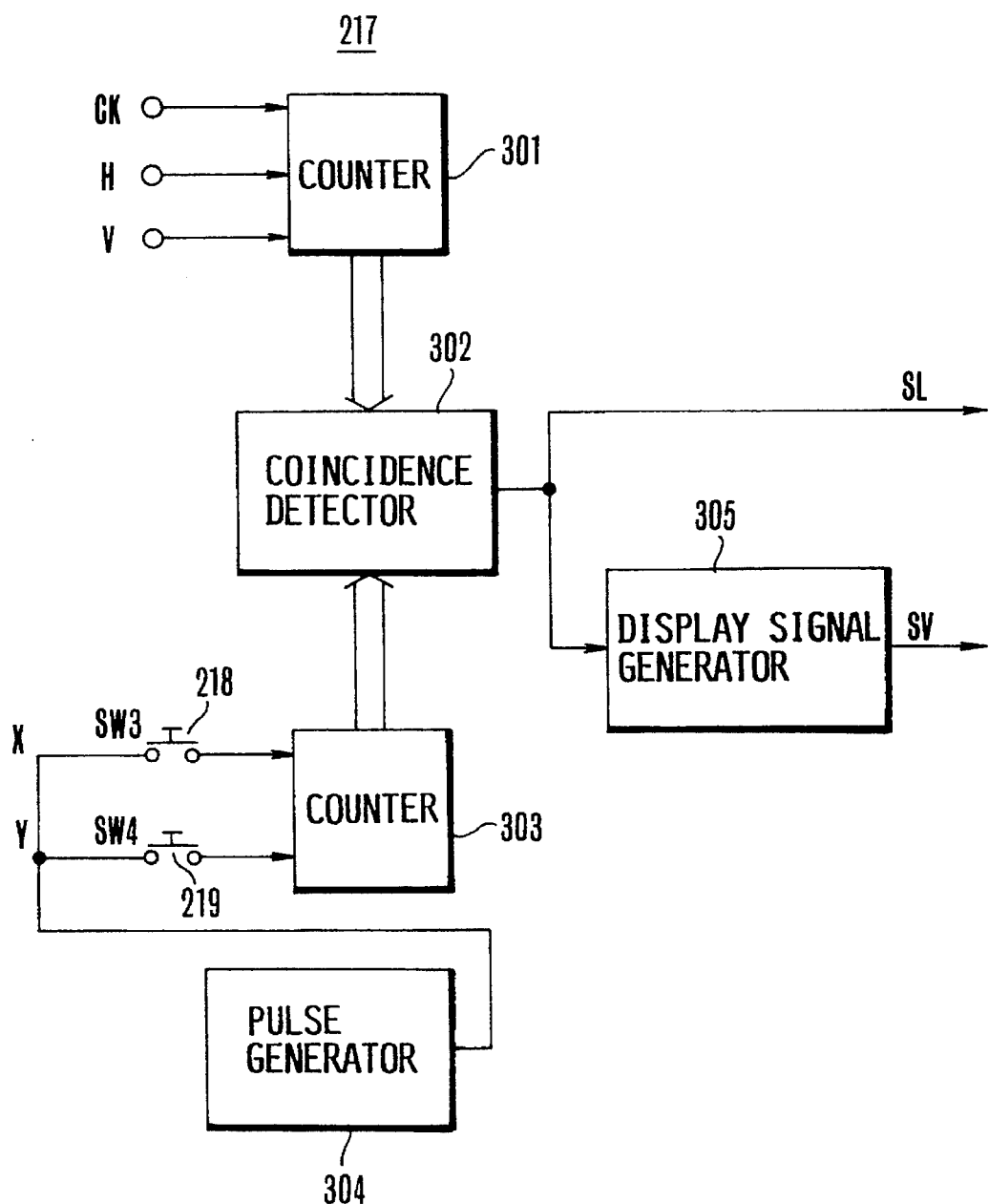
FIG. 7 is a block diagram showing by way of example the details of arrangement of a gate pulse generator shown in FIG. 6.

FIG. 7 shows by way of example the details of arrangement of the gate pulse generator 217 of FIG. 6. Referring to FIG. 7, a first counter 301 is arranged to find the position on the picture plane indicated by the input video signal by counting the clock pulse CK, the horizontal sync pulse H and the vertical sync pulse V. A coincidence detector 302 is arranged to generate a pulse when two input data come to coincide with each other. A second counter 303 is arranged to count the number of pulses coming from the switches 2118 and 219 (SW3 and SW4). A pulse generator 304 is arranged to generate pulses at a frequency between several Hz to 0.1 Hz. A display signal generator 305 is arranged to generate the display signal SV according to the pulse supplied from the coincidence detector 302.

The first counter 301 constantly generates data indicating the position on the picture plane shown by the input video signal. The second counter 303 generates the data indicative of the designated position on the picture plane set by the switches 218 and 219 by counting the pulses generated by the pulse generator 304 every time the switch 218 or 219 is pushed. The data thus generated by the second counter 303 is supplied to the coincidence detector 302. The coincidence detector 302 compares the data from the first counter 301 indicating the position on the picture plane as shown by the input video signal with the data from the second counter 303 indicating the designated position on the picture plane. When the two data come to coincide with each other, the coincidence detector 302 produces a pulse. The pulse output from the coincidence detector 302 is supplied as the latch signal SL to the latch circuit 211 and is supplied also to the display signal generator 305. This causes the display signal generator 305 to produce the display signal SV. The display signal SV is then supplied to the adder 220.

The video signal correction device which is described above as the second embodiment of the invention is arranged to correct color reproduction on the basis of a color obtained in the designated area of the picture plane. This enables the device to correct the color reproducibility of the video signal in accordance with the designation without recourse to any complex arrangement.

Figure 8:
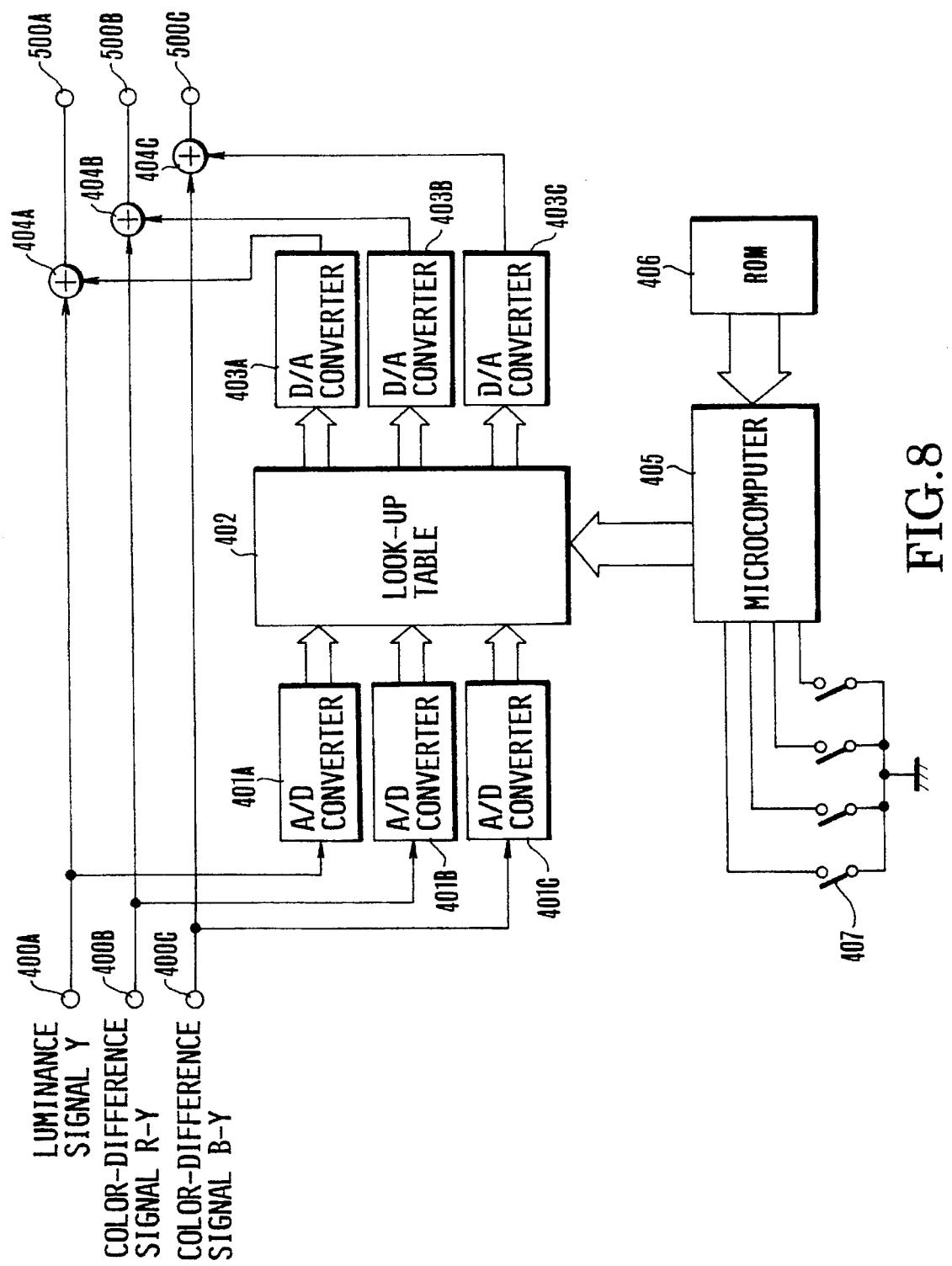
FIG. 8 is a block diagram showing in outline the arrangement of a third embodiment of the invention.

The following describes third, fourth and fifth embodiments of this invention:

FIG. 8 shows in outline the arrangement of the third embodiment of the invention. FIG. 8 includes A/D converters 401A, 401B and 401C; a look-up table 402 (hereinafter referred to as L.U.T.) which is composed of a rewritable memory; D/A converters 403A, 403B and 403C; addition circuits 404A, 404B and 404C; a microcomputer 405; a read-only memory (ROM) 406; and a switch circuit 407.

With the third embodiment arranged as described above, analog inputs of a luminance signal Y and two color-difference signals R-Y and B-Y which are received at input terminals 400A, 400B and 400C are converted into digital signals by the A/D converters 401A, 401B and 401C. These digital signals are supplied to the L.U.T. 402. Upon receipt of them, the L.U.T. 402 produces correction data relative to the levels of these digital signal inputs. The correction data output from the L.U.T. 402 is converted into analog correction signals by the D/A converters 403A, 403B and 403C. These analog correction signals are supplied to the addition circuits 404A, 404B and 404C. The input analog luminance signal and the input analog color-difference signals coming from the input terminals 400A, 400B and 400C are corrected by adding the Correction signals to them. The signals thus corrected are output from output terminals 500A, 500B and 500C respectively.

The microcomputer 405 is arranged to monitor the state of the switch circuit 407. The switch circuit 407 is arranged to have its position either manually or automatically switched according to the color temperature of an object being shot by the video camera which is equipped with this video signal correction device. The microcomputer 405 detects information on the color temperature of the object which is set by the switch circuit 407 and reads out from the ROM 406 the correction data corresponding to the detected color temperature. At the ROM 406, correction data applicable to various color temperature values are stored beforehand. The applicable correction data read out from the ROM 406 is transferred to the L.U.T. 402. After that, the microcomputer 405 reads out from the ROM 406 the correction data applicable to the color temperature of the object and writes the data into the L.U.T. 402 every time the state of the switch circuit 407 changes.

In the third embodiment which is arranged as described above, the switch position is either manually or automatically shifted according to the color temperature of the object being shot by the color video camera. This enables the embodiment to perform its correcting action to ensure adequate color reproduction.

Further, the information to be selected by the switch circuit is not limited to the color temperature. It may be information on the brightness of the object instead of the color temperature. The arrangement to write the contents of data stored in the ROM directly into the L.U.T. may be changed to arrange the ROM to store such data that is to be computed by the microcomputer in rewriting the correction data at the L.U.T.. In that instance, the amount of correction data can be lessened by arranging the microcomputer to automatically form the correction data to be written into the L.U.T..

Figure 9:
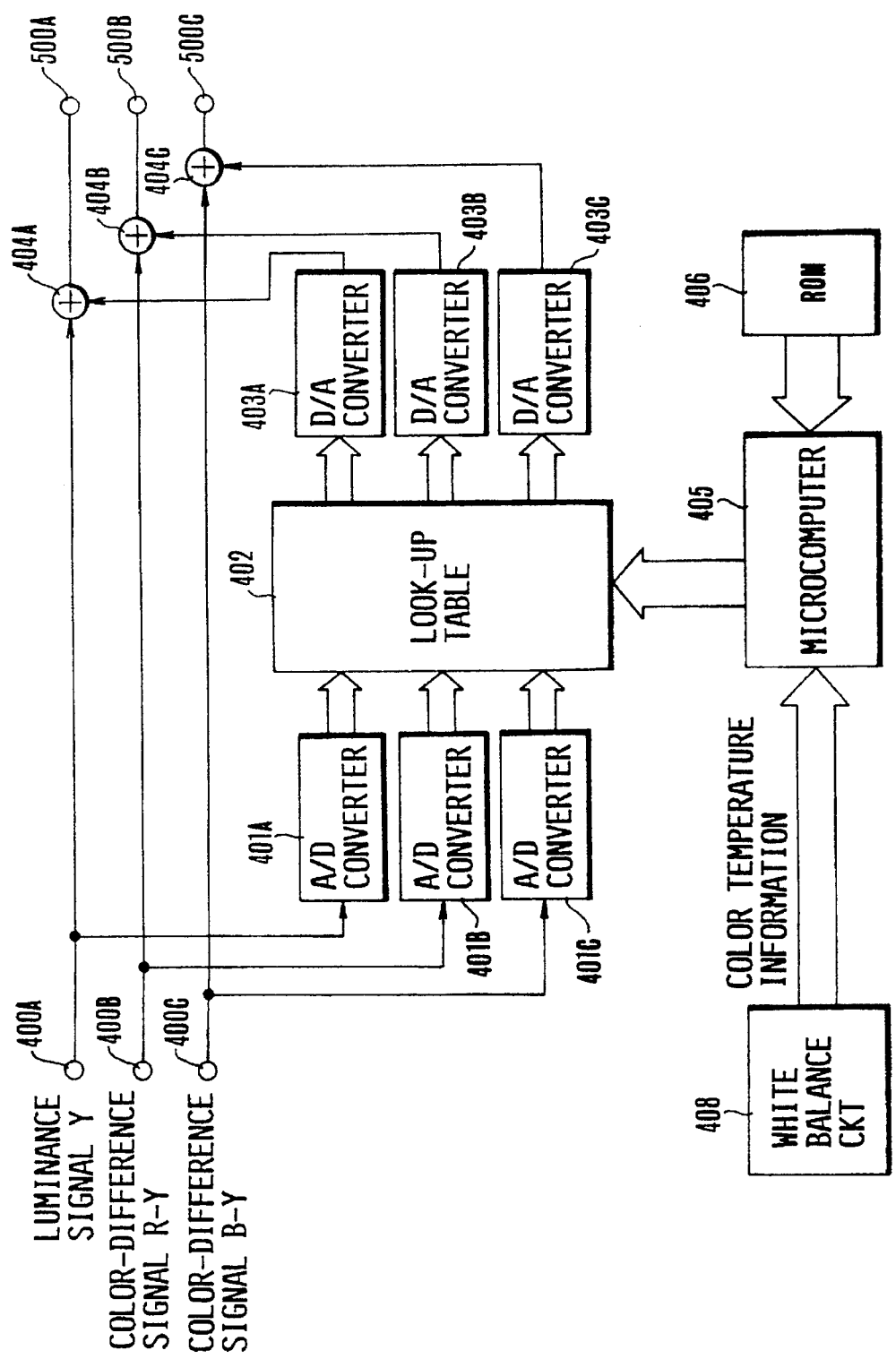
FIG. 9 is a block diagram showing in outline the arrangement of a fourth embodiment of the invention.

FIG. 9 shows in outline the arrangement of the fourth embodiment of this invention. In FIG. 9, the same components as those of FIG. 8 are indicated by the same reference numerals.

The fourth embodiment differs from the third embodiment in the following point: The color temperature information to be given to the microcomputer 405 is not supplied by the switch circuit but is arranged to be automatically supplied from Some other circuit such as a white balance circuit 408 of the color video camera.

The microcomputer 405 selects and reads out the correction data from the ROM 406 according to the color temperature information received from the white balance circuit 408. The correction data read out is transferred to the L.U.T. 402. The microcomputer 405 transfers correction data from the ROM 406 to the L.U.T. 402 every time a change takes place in the color temperature information received from the white balance circuit 408.

Figure 10:
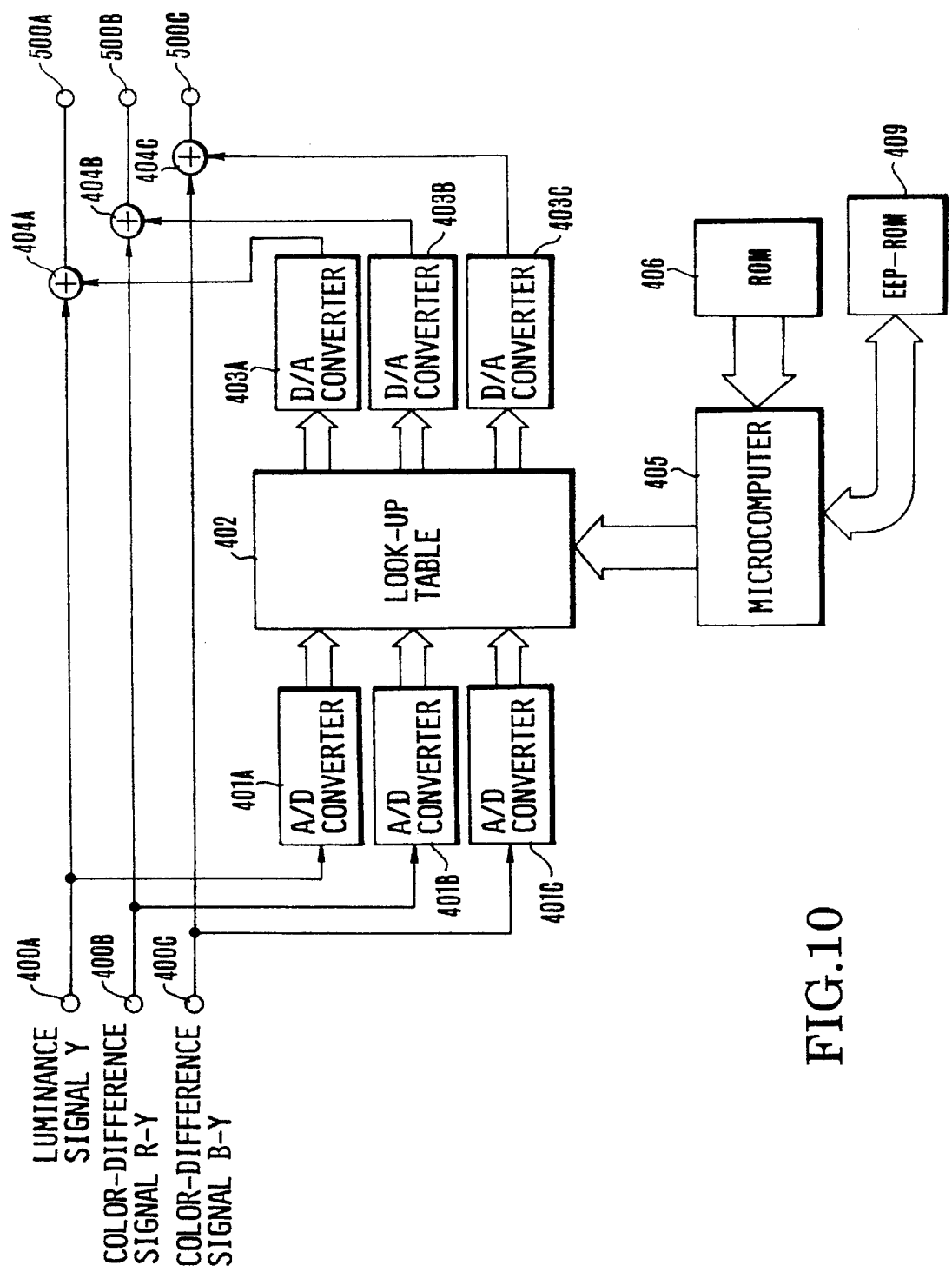
FIG. 10 is a block diagram showing in outline the arrangement of a fifth embodiment of the invention.

FIG. 10 shows in outline the arrangement of a fifth embodiment of this, invention. In FIG. 10, the component parts performing the same functions as those of the the fourth embodiment are indicated by the same reference numerals as in FIG. 8. Referring to FIG. 10, a reference numeral 409 denotes a read-only memory arranged to be electrically writable and erasable (hereinafter referred to as EEP-ROM). The EEP-ROM 409 stores therein information on the intrinsic characteristics of the color video camera written in during the process of adjustment work on the camera.

With the fifth embodiment arranged as described above, the microcomputer 405 first reads out from the EEPROM 409 the information on the intrinsic characteristics of the camera. Then, the correction data stored in the ROM 406 is corrected on the basis of the information on the characteristics when the correction data is transferred to the L.U.T.. 402. This enables the embodiment to make a correction most apposite to the intrinsic characteristic of the video camera.

As described above, the video signal correction device arranged as the fifth embodiment of the invention is capable of always most appositely correcting the video signal to enhance the reproducibility of the video signal without being affected by the color temperature of the object and the intrinsic characteristic of the camera.

Figure 11:
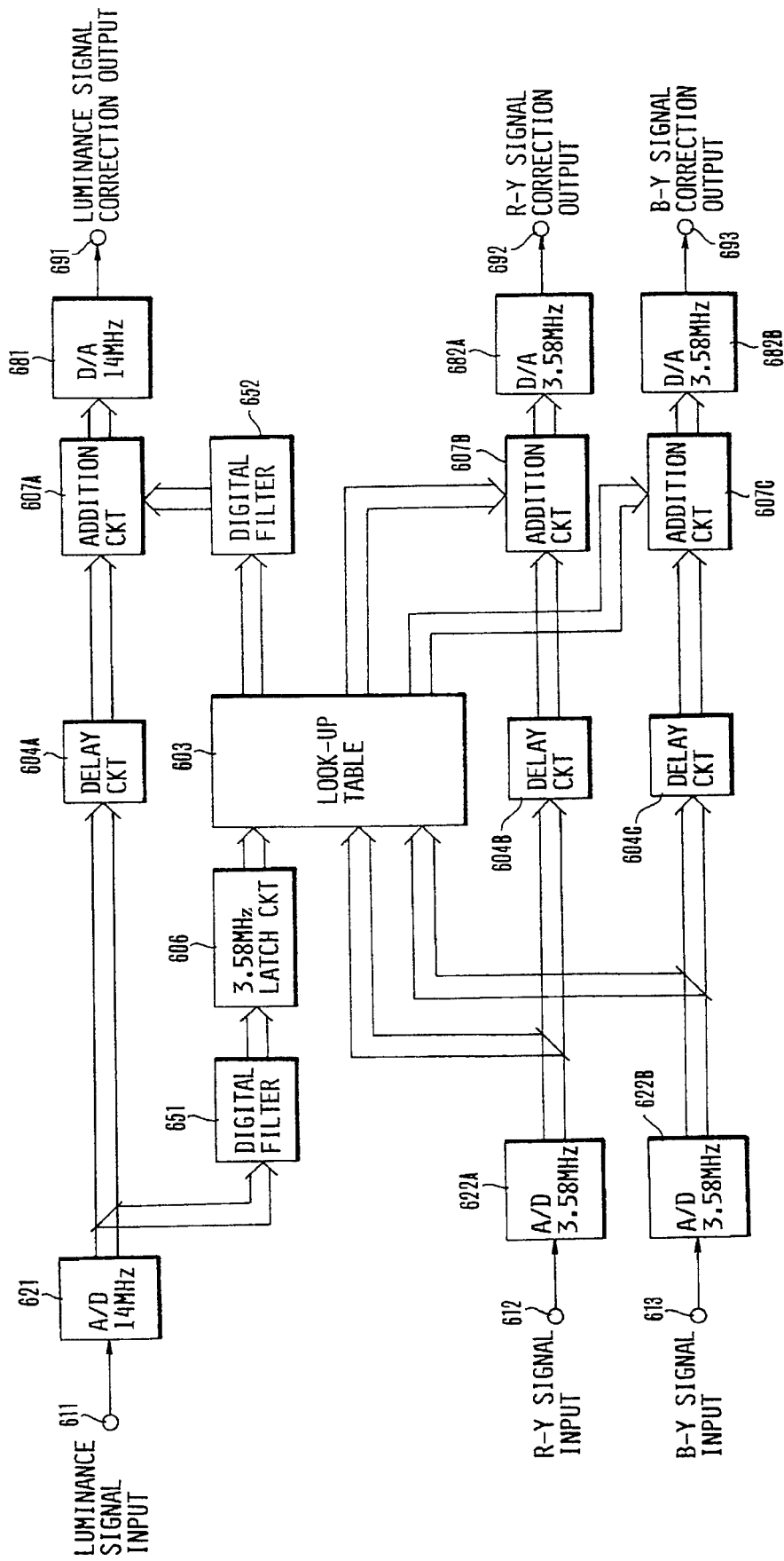
FIG. 11 is a block diagram showing in outline the arrangement of a sixth embodiment of the invention.

The following describes in detail a sixth embodiment of the invention: FIG. 11 shows in outline the arrangement of the sixth embodiment. Referring to FIG. 11, an input terminal 611 is arranged to receive a luminance signal from, for example, a video camera or the like. An input terminal 612 is arranged to receive a color-difference signal R-Y from the video camera or the like. Another input terminal 613 is arranged to receive a color-difference signal B-Y. An A/D converter 621 is arranged to A/D (analog-to-digital)-convert the input luminance signal supplied via the input terminal 611 at a sampling frequency of for example, 14 MHz. A/D converters 622A and 622B are arranged to A/D-convert the color-difference signals supplied via the input terminals 612 and 613 at a sampling frequency of, for example, 3.58 MHz. A look-up table 603 is composed of a ROM which is arranged to operate in synchronism with a clock signal of a frequency of 3.58 MHz. Delay circuits 604A, 604B and 604C are arranged to delay input signals for predetermined periods of time respectively.

A digital low-pass filter 651 is arranged to operate in synchronism with a clock signal of a frequency of 14 MHz and has a pass-band of about 1.79 MHz. Another digital low-pass filter 652 is of a pass-band of about 7 MHz and is arranged to operate in synchronism with a clock signal of a frequency of 14 MHz. A latch circuit 606 is arranged to operate in synchronism with a clock signal of a frequency of 3.58 MHz. Addition circuits 607A, 607B and 607C are arranged to add data output from the look-up table 603 to the digital signals obtained by the A/D converters and delayed by the delay circuits 604A, 604B and 604C for the given periods of time respectively. A D/A converter 681 is arranged to operate in synchronism with a clock signal of a frequency of 14 MHz. D/A converters 682A and 682B are arranged to operate in synchronism with a clock signal of a frequency of 3.58 MHz. An output terminal 691 is arranged to output the corrected luminance signal. An output terminal 692 is arranged to output the corrected color-difference signal R-Y. An output terminal 693 is arranged to output the corrected color-difference signal B-Y.

The luminance signal received at the input terminal 611 is converted into a digital signal by the A/D converter 621. The digital signal is supplied to the delay circuit 604A and also to the digital low-pass filter 651. The digital filter 651 limits the frequency band of the digital luminance signal to a band not exceeding 1.79 MHz. The luminance signal is then supplied from the digital filter 651 to the latch circuit 606 which operates in synchronism With the clock signal of a frequency of 3.58 MHz. In synchronism with the clock signal of 3.58 MHz, the latch circuit 606 holds the input signal. The luminance signal output from the latch circuit 606 is supplied to the look-up table 603 along with the color-difference signals which have been converted into digital signals by the A/D converters 622A and 622B.

In a case where the luminance signal and the color-difference signals are supplied to the input terminals 611, 612 and 613 after an object of a blue color is shot by the video camera, for example, these input signals are converted into digital signals by the A/D converters 621, 622A and 622B. The digital signals are supplied to the look-up table 603, with the digital luminance signal being supplied through the digital low-pass filter 651 and the latch circuit 606. Then, luminance signal correction data stored in the look-up table 603 is arranged in such a way as to give correction data for the level of the luminance signal if, for instance, the luminance signal coming from the latch circuit 606 is found to be at a level deviating from a normal prescribed level while the vectors of the digital color-difference signals R-Y and B-Y are near an area indicating a blue color. The look-up table 603 stores also color-difference signal correction data for correcting the vectors shown by the color-difference signals R-Y and B-Y.

The luminance signal correction data which is output from the look-up table 603 according to the digital luminance signal supplied from the latch circuit 606 as mentioned above is supplied to the digital filter 652 which has a pass-band of about 7 MHz and is arranged to operate in synchronism with a clock signal of a frequency of 14 MHz. The luminance signal correction data is thus band-limited by the digital filter 652 and, after that, is supplied to the addition circuit 607A. Meanwhile, the color-difference signal correction data which are output from the look-up table 603 according to the digital color-difference signals supplied from the A/D converters 622A and 622B are supplied to the addition circuits 607B and 607C.

The addition circuits 607A, 607B and 607C add these correction data supplied from the look-up table 603 respectively to the digital luminance signal and the digital color-difference signals which are delayed by the delay circuits 604A, 604B and 604C for the purpose of time adjustment. The signal outputs of these addition circuits are D/A converters 681, 682A and 682B respectively. With the correction data added in this manner, the luminance signal and the color-difference signals which are supplied to the input terminals 611, 612 and 613 are adequately corrected with respect to color reproducibility.

The digital luminance signal output from the addition circuit 607A after correction is converted into an analog luminance signal by the D/A converter 681 which operates in synchronism with a clock signal of a frequency of 14 MHz. The analog luminance signal thus obtained is output from an output terminal 691. The digital color-difference signals output from the addition circuits 607B and 607C after correction are converted into analog color-difference signals R-Y and B-Y by the D/A converters 682A and 682B which operate in synchronism with a clock signal of frequency 3.58 MHz. The analog color-difference signals thus obtained are output from output terminals 692 and 693 respectively.

As mentioned above, the clock signal which is used in A/D and D/A converting the luminance signal is set at the frequency of 14 MHz. In forming the luminance signal correction data, the correction data stored in the look-up table is read out according to the digital luminance signal the band of which is limited to the Nyquist frequency of the operating clock frequency of the look-up table by the digital filter. The band of the correction data thus read out is converted into the band of the digital luminance signal obtained by A/D conversion. After that, the correction data is added to the digital luminance signal. This enables the luminance signal correcting action to be performed without deteriorating the luminance signal, with the look-up table reading frequency kept at a low level. Therefore, the correcting process can be appositely carried out without necessitating the use of a memory of a large storage capacity for the look-up table.

The video signal correction device which is arranged as described above as the sixth embodiment of this invention is therefore capable of enhancing the color reproducibility of the video signal by correcting it in an optimum manner with simple arrangement.

The following describes in detail a seventh embodiment of this invention: In the case of the seventh embodiment, two color-difference signals included in a color video signal are at first converted into polar coordinates data (r and Θ). A look-up table is arranged beforehand to store necessary correction data for correction of the chrominance signal. The correction data is read out from the look-up table in accordance with the polar coordinates data. Then, the chrominance signal included in the video signal is corrected with the correction data read out to make the color of the video signal reproducible with fidelity.

Figure 12:
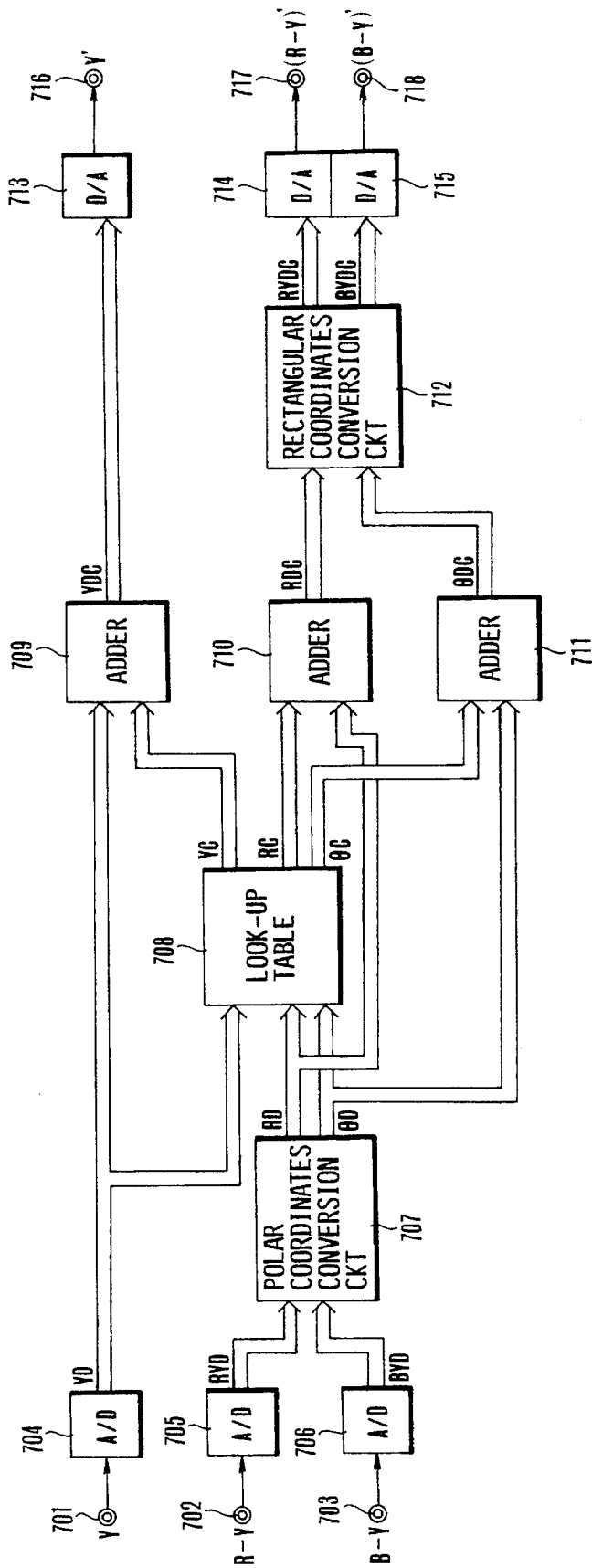
FIG. 12 is a block diagram showing in outline the arrangement of a seventh embodiment of the invention.

FIG. 12 shows in outline the arrangement of the seventh embodiment. Referring to FIG. 12, input terminals 701, 702 and 703 are arranged to receive from a video camera which is not shown a luminance signal Y and color-different signals R-Y and B-Y. Reference numerals 704, 705 and 706 denote A/D converters. A polar coordinates conversion circuit 707 is arranged to convert two digital color-difference signals RYD and BYD output from the A/D converters 705 and 706 into polar coordinates data (RD, ΘD) as x-axis data and y-axis data respectively. The data RD indicates the length of a line segment extending to the origin and the data ΘD an angle formed by the segment RD and the X-axis. A look-up table 708 is composed of a ROM, etc. and is arranged to produce the correction data for correction of the chrominance and luminance signals in accordance with the combination of input signals. Reference numerals 709, 710 and 711 denote adders. A rectangular coordinates conversion circuit 712 is composed of a memory, etc. and is arranged to produce rectangular coordinates data (RYDC, BYDC) by using the polar coordinates data (RDC, ΘDC) as addresses. The rectangular coordinates data RYDC indicates X-axis data while the BYDC indicates Y-axis data. The embodiment further comprises D/A converters 713, 714 and 715; and output terminals 716, 717 and 718.

Figure 13A:
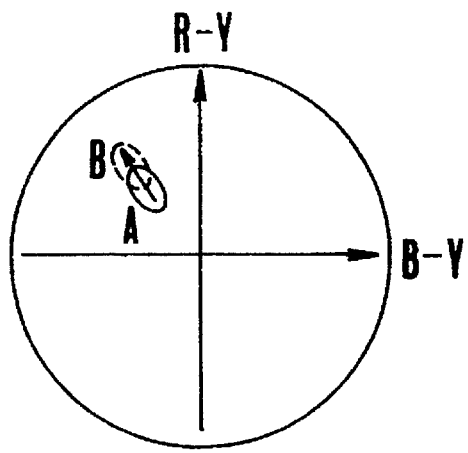
FIGS. 13(a) and 13(b) show the polar coordinates converting action of the seventh embodiment shown in FIG. 12.
Figure 13B:
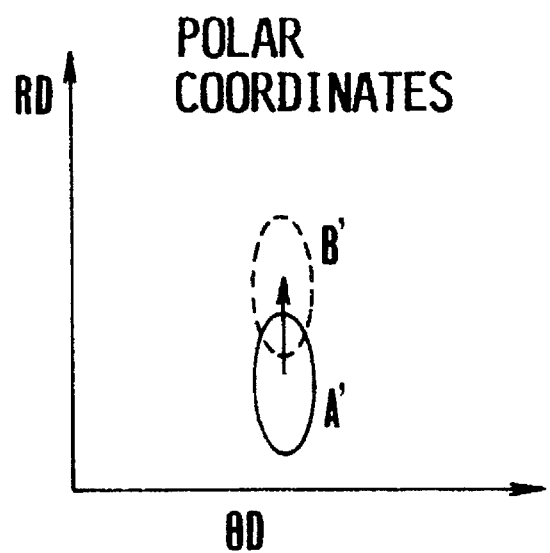

Referring to FIGS. 13(*a*) and 13(*b*), the coordinates converting action of the seventh embodiment arranged as shown in FIG. 12 is described as follows: FIG. 13(*a*) is a vectorial representation of the chrominance signal obtained from the color difference signal data B-Y and R-Y. In the case of FIG. 13(*a*), the chrominance signal obtained in an area indicated by a full line A is correct ed to, an area indicated by a broken line B. In the case of FIG. 13(*b*), the area of the chrominance signal is indicated by the polar coordinates data (RD, ΘD). The area A of FIG. 13(*a*) corresponds to an area A' of FIG. 13(*b*) and the area B of FIG. 13(*a*) to an area B' of FIG. 13(*b*). In correcting the chrominance signal by the rectangular coordinates representation as shown in FIG. 13(*a*), both the R-Y data and B-Y data must be corrected. Whereas, in the case of the polar coordinates representation as shown in FIG. 13(*b*), it requires to correct only the line segment data RD. Therefore, the use of the polar coordinates representation permits reduction in the amount of correction data to be stored beforehand in the look-up table 708. This permits simplified arrangement of the look-up table 708.

The seventh embodiment shown in FIG. 12 operates as follows: The input luminance signal Y and the input color-difference signals R-Y and B-Y are respectively converted by the A/D conversion circuits 704, 705 and 706 into digital signals YD; RYD and BYD. The digital color difference signals RYD and BYD are supplied to the polar coordinates conversion Circuit 707 to be converted into the polar coordinates data (RD, ΘD). The digital luminance signal YD and the polar coordinates data (RD, ΘD) are supplied to the look-up table 708. Then, among luminance signal correction data YC and chrominance signal correction data RC and ΘC which have been stored in the look-up table 708, the correction data corresponding to the inputs YD, RD and ΘD are output from the look-up table.

These correction data YC, RC and ΘC which are thus output from the look-up table 708 are supplied to the adders

709, 710 and 711 to be added to the digital luminance signal YD which is output from the A/D conversion circuit 704 and the digital color-difference signals RD and ΘD which are polar-coordinates-converted by the polar coordinates conversion circuit 707 respectively. As a result, these adders produce corrected signals YDC, RDC and ΘDC. The outputs RDC and ΘDC of the adders 710 and 711 are still in the form of the polar-coordinates-converted signals. Therefore, these signals RDC and ΘDC are supplied to the rectangular coordinates conversion circuit 712 to be converted from their state of polar coordinates representation into color-difference signal data RYDC and BYDC which are in the state of rectangular coordinates representation. These signals YDC, RYDC and BYDC are supplied respectively to the D/A converters 713, 714 and 715 to be converted into an analog luminance signal Y' and analog color difference signals R-Y' and B-Y' before they are produced from the output terminals 716, 717 and 718 respectively.

Figure 14:
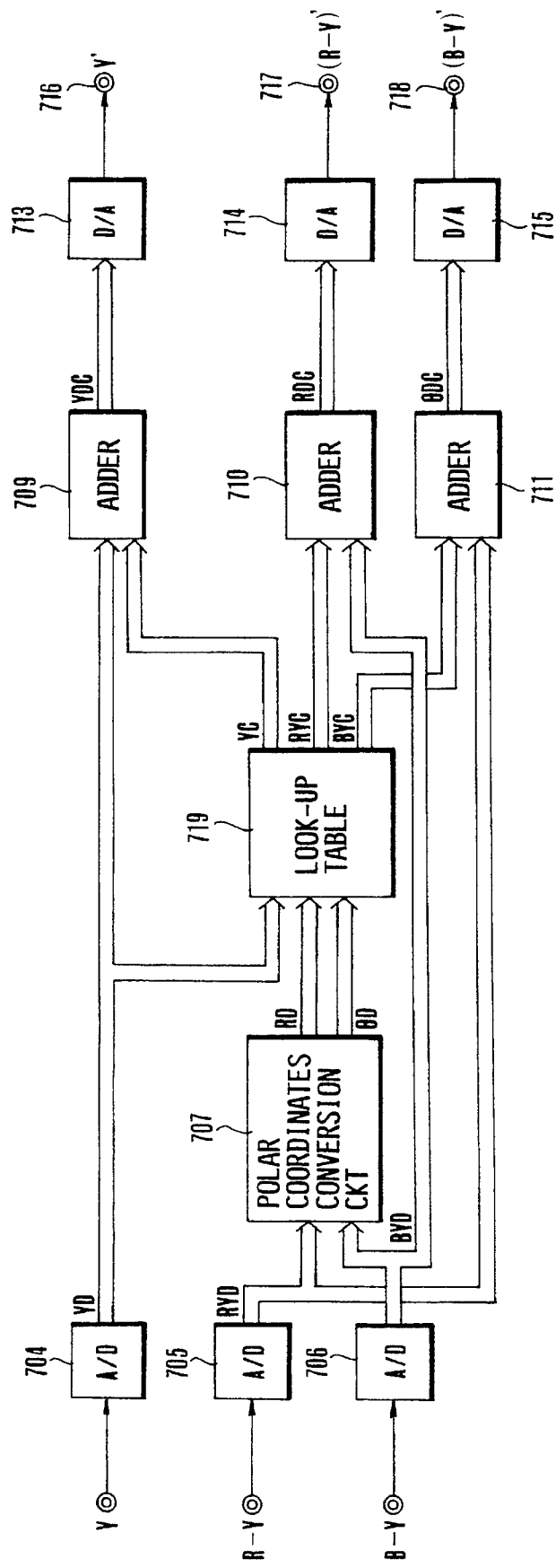
FIG. 14 is a block diagram showing in outline the arrangement of an eighth embodiment of the invention.

FIG. 14 shows in outline the arrangement of an eighth embodiment of this invention. Unlike the seventh embodiment shown in FIG. 12, the eighth embodiment is arranged to directly use the color-difference signal correction data RYC and BYC output from a look-up table 719 without processing them through any rectangular coordinates conversion circuit. With the exception of this, the eighth embodiment is arranged in exactly the same way as in the case of the seventh embodiment shown in FIG. 12. Therefore, the video signal correction device is further simplified by the arrangement of the eighth embodiment.

Each of the embodiments described is capable of correcting the chrominance signal of the video signal in an optimum manner to enhance the color reproducibility thereof by performing the correcting action according to the combination of the levels of the luminance and chrominance signals.

In the case of the eighth embodiment of the invention, the input chrominance signal is converted into polar coordinates data and the correction data is arranged to be formed according to the polar coordinates data. This arrangement enables the embodiment to adequately perform a color correcting action with a simplified structural arrangement thereof.

What is claimed is:

1. A video signal correction device for correcting a video signal, comprising:

a) coordinates conversion means, arranged to input two kinds of color information signals, for producing polar coordinates data by using one of the input two kinds of color information signals as a polar axis;

b) correction data storing means for storing luminance signal correction data, depending on a luminance signal and the polar coordinates data output from said coordinates conversion means, and color information signal correction data and for outputting the stored luminance signal correction data and the color information signal correction data in accordance with said luminance signal and the polar coordinates data output from said coordinates conversion means; and c) correction means for correcting said luminance signal and the polar coordinates data output from said coordinates conversion means on the basis of said luminance signal correction data and the color information signal correction data output from said correction data storing means.

2. A device according to claim 1, wherein said correction means includes addition means for adding the luminance signal correction data and the color information signal correction data to said luminance signal and the polar coordinates data output from said coordinates conversion means, respectively.

3. A video signal correction device, comprising:

a) conversion means for receiving a first color information data, and converting the received first color information data into a second color information data;

b) correction data storing means, having a memory device stored with a plurality of kinds of luminance correction data and color information correction data corresponding respectively to a luminance data and the second color information data output from said conversion means, for reading out the luminance correction data and the color information correction data from the memory device in accordance with said luminance data and the second color information data output from the conversion means; and c) correction means for correcting the luminance data and the second color information data output from the conversion means by using the luminance correction data and the color information correction data output from the correction data storing means.

4. A device according to claim 3, wherein said correction data storing means includes addition means for adding the luminance correction data and the color information correction data to the luminance data and the second color information data output from said conversion means, respectively.

5. A device according to claim 3, wherein said second color information data has an information amount different from that of the first color information data.

6. A device according to claim 3, wherein said second color information data shows color components different from those of the first color information data.

* * * * *

UNITED STATES PATENT AND TRADEMARK OFFICE
CERTIFICATE OF CORRECTION

PATENT NO. : 5,510,850      Page 1 of 2
DATED      : April 23, 1996
INVENTOR(S): Osamu Ueda, et al.

It is certified that error appears in the above-indentified patent and that said Letters Patent is hereby corrected as shown below:

Col. 2, line 41, change "information-signals" to -- information signals --.

Col. 3, line 57, change "convert,the" to -- convert the --.

Col. 4, line 44, change "Output", to -- output --.

Col. 4, line 49, change "circuit 3i" to -- circuit 3 --.

Col. 5, line 3, change ".by" to -- by --.

Col. 5, line 50, change "Converted" to -- converted --.

Col. 6, line 33, change "Signal" to -- signal --.

Col. 6, line 37, delete "correction" and insert -- correct an --.

Col. 7, line 6, change "are-supplied" to -- are supplied --.

Col. 7, line 26, change "circuit 213" to -- circuit 211 --.

Col. 7, line 32, change "Specifically" to -- specifically --.

Col. 8, line 1, change "2118" to -- 218 --.

Col. 8, line 51, change "the." to -- the --.

Col. 8, line 55, change "Correction" to -- correction --.
Col. 9, line 33, change "Some" to -- some --.

UNITED STATES PATENT AND TRADEMARK OFFICE
CERTIFICATE OF CORRECTION

PATENT NO. : 5,510,850
DATED : April 23, 1996
INVENTOR(S) : Osamu Ueda, et al.

It is certified that error appears in the above-indentified patent and that said Letters Patent is hereby corrected as shown below:

Col. 9, line 44, change "this," to -- this --.

Col. 9, line 59, change "L.U.T.." to -- L.U.T. --.

Col. 10, line 11, after "of" insert -- , --.

Col. 10, line 47, change "With" to -- with --.

Col. 11, line 57, change "look-up,table" to -- look-up table --.

Col. 12, line 37, change "correct ed" to -- corrected -- and change "to," to -- to --.

Col. 12, line 58, change "Circuit" to --circuit --.

Signed and Sealed this

Twelfth Day of November, 1996

*Attest:*

BRUCE LEHMAN

*Attesting Officer*  *Commissioner of Patents and Trademarks*